United States Patent [19]
Mayer

[11] Patent Number: 6,107,861
[45] Date of Patent: Aug. 22, 2000

[54] CIRCUIT FOR SELF COMPENSATION OF SILICON STRAIN GAUGE PRESSURE TRANSMITTERS

[75] Inventor: Paul Mayer, Sandy Hook, Conn.

[73] Assignee: Bristol Babcock, Inc., Watertown, Conn.

[21] Appl. No.: 09/014,235

[22] Filed: Jan. 27, 1998

[51] Int. Cl.$^7$ .................................................. H01L 35/00
[52] U.S. Cl. ........................ 327/513; 327/378; 330/256
[58] Field of Search ................................ 327/513, 378, 327/103, 588; 330/260, 256, 289, 291, 293

[56] References Cited

U.S. PATENT DOCUMENTS

| | | | |
|---|---|---|---|
| 3,924,458 | 12/1975 | Woodworth et al. | 73/133 R |
| 4,110,677 | 8/1978 | Boronkay et al. | 323/19 |
| 4,233,848 | 11/1980 | Sato et al. | 73/727 |
| 4,373,399 | 2/1983 | Beloglazov et al. | 73/777 |
| 4,463,274 | 7/1984 | Swartz | 327/513 |
| 4,529,949 | 7/1985 | De Wit et al. | 330/289 |
| 5,184,520 | 2/1993 | Naito | 73/862.62 |
| 5,253,532 | 10/1993 | Kamens | 73/708 |
| 5,315,266 | 5/1994 | Lorenz | 330/294 |
| 5,339,046 | 8/1994 | Kornfeld et al. | 330/277 |
| 5,460,050 | 10/1995 | Miyano | 73/766 |
| 5,622,901 | 4/1997 | Fukada | 438/50 |
| 5,795,069 | 8/1998 | Mattes et al. | 374/183 |

FOREIGN PATENT DOCUMENTS 361243338 10/1986 Japan .................................. 327/513

*Primary Examiner*—Kenneth B. Wells
*Assistant Examiner*—Hai L. Nguyen
*Attorney, Agent, or Firm*—Perman & Green, LLP

[57] ABSTRACT

A circuit for compensating a silicon strain gauge pressure transmitter. The circuit includes: a current source, an embodiment of which may include an amplifying device and means for supplying the current source with an electric potential, a strain gauge bridge, a plurality of resistances that includes a feedback resistance, a series resistance, a current sampling resistance, and a load with parameters. The key to this invention is to add a series resistance and a feedback resistance to the circuit which eliminates the need for $R_c$, the current sample resistor, to be a thermistor, and increases the operating temperature range of the sensor by compensating the sensor's parameter variations with temperature.

8 Claims, 2 Drawing Sheets

CIRCUIT FOR SELF COMPENSATION OF SILICON STRAIN GAUGE PRESSURE TRANSMITTERS

FIELD OF THE INVENTION

This invention relates generally to electrical circuits and, in particular, to electronic circuits which are capable of self compensating silicon strain gauge pressure sensors.

BACKGROUND OF THE INVENTION

Occasions arise wherein a circuit designer of an electronic circuit that includes a silicon strain gauge transmitter or sensor is required to compensate for variations in temperature that occur. In order to maintain the accuracy of the measurements within specified limits, it is known to generally use an independent, separate element or component to compensate the positive temperature coefficient of sensitivity(with constant current) of the silicon strain gauge pressure transmitter. For example, the curves for typical silicon strain gauge pressure transmitters (sensors) have a slightly positive temperature coefficient of sensitivity with constant current excitation. Under conventional practice the circuit would need or use an additional thermally sensitive resistor, also known as a thermistor, with a positive temperature coefficient of sensitivity to temperature to compensate for the effects of temperature. Thus the circuit is adjusted to compensate for the effects of temperature by reducing current slightly as temperature increases.

It is known in the art, shown in FIG. 1, that the output 1a of an operational amplifier 1 is connected to one node (input node) 2a of a strain gauge bridge 2 and another node (output node) 2b of the strain gauge bridge 2 is connected to an inverting input 1b of the operational amplifier 1. The output node 2b is also connected to one end of a current sampling resistance $R_c$ (which may be a thermistor). The other end of the current sampling resistance $R_c$ is connected to ground or a zero voltage point. A positive terminal of a reference voltage, $V_{ref}$, represented by a voltage source, such as a battery, is connected to a non-inverting input 1c of the operational amplifier 1, with negative end of said battery connected to the zero potential point.

It is also known in the art that, in practice, thermistors are non-linear devices which tend to limit or compromise the measurement accuracy of the strain gauge. Additionally, a thermistor's parameters may shift value upon exposure to high temperature, which would compromise the measurement range. Prior to this invention, designers were limited to using a non-linear element, such as a thermistor, to compensate the current variations due to temperature change. Furthermore, the time constants of the strain gauge bridge and the thermistor may be different, resulting in the compensation lagging or leading the temperature induced change in bridge resistance. As can be appreciated, this technique does not provide an optimum solution for accurately compensating a silicon strain gauge based system within a temperature range, such as a pressure sensor.

OBJECTS AND ADVANTAGES OF THE INVENTION

It is a first object and advantage of this invention to provide an improved circuit for self compensating electric current variations caused by temperature changes, without requiring the use of a non-linear element, such as a thermistor.

It is a second object and advantage of this invention to provide an electronic circuit for self compensation of silicon strain gauge pressure transmitters wherein only the silicon stain gauge pressure transmitter's parameters vary with a change of temperature.

It is a third object and advantage of this invention to provide a circuit that compensates for the non-linear properties of a silicon stain gauge pressure transmitter, without requiring the use of a separate non-linear component.

It is a fourth object and advantage of this invention to provide a circuit which uses no temperature sensing element other than the silicon gauge transmitter to achieve an system accuracy within +/−0.3% in a temperature range of −40° C. to 85° C.

It is a further object and advantage of this invention to provide a temperature compensated silicon stain gauge sensor that only uses commonly available and low priced, non-precision components.

SUMMARY OF THE INVENTION

The foregoing and other problems are overcome and the objects of the invention are realized by apparatus in accordance with embodiments of this invention, wherein a feedback resistor and a series resistor are respectively added to the current power source of the strain gauge pressure sensor circuit.

The present invention resides in a new and improved circuit for self compensation of silicon strain gauge pressure transmitters which overcomes the disadvantages of the prior art. In its broader aspects, the present invention contemplates a circuit for self compensation of the circuitry with a temperature range with a load as the only element which has parameters that vary with temperature. The circuit comprises a current source, a feedback resistance, a series resistance, and the load which has parameters that vary with temperature.

The present invention contemplates a circuit for self compensation of a non-linear resistive load that comprises a feedback resistance, a series resistance, the load itself such as Wheatstone bridge, an operational amplifier, a battery as reference voltage, and a current sampling resistor. Additionally, the instant invention eliminates the need for a thermally sensitive resistance to compensate the positive temperature coefficient of sensitivity of the bridge due to the compensating nature of the circuitry. The operational amplifier functions as a source of constant current for the bridge. This arrangement eliminates the need for a thermally sensitive resistor for compensating the positive temperature coefficient of the bridge, and leaves the bridge resistance $R_B$ as the only resistance that varies with temperature. This invention also eliminates a time lag between sensing temperature and correcting for temperature effects, since the circuit only has one element, the strain gauge sensor, whose parameters vary with temperature.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
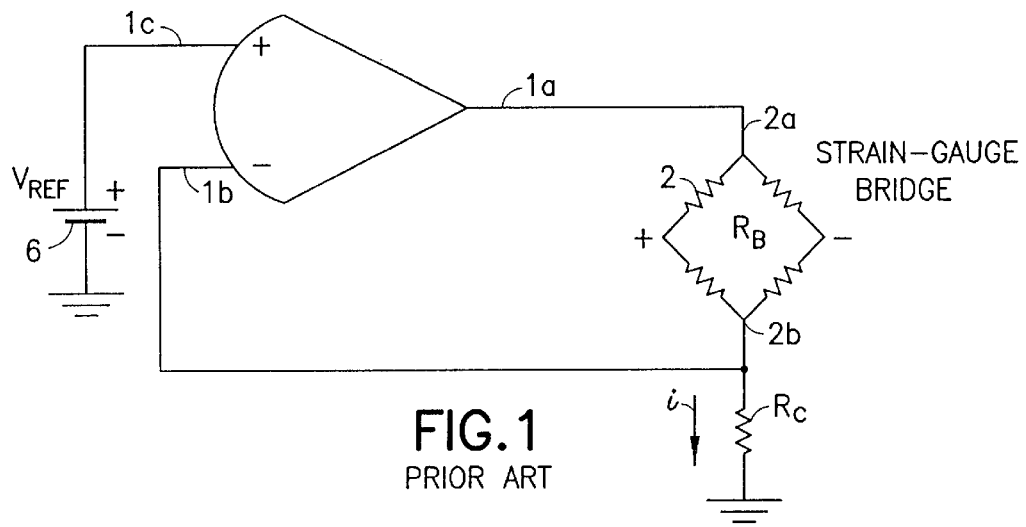
FIG. 1 is a schematic diagram of a prior art silicon strain gauge bridge sensor circuit having a thermistor, $R_c$, which functions to compensate the temperature variations of the strain gauge bridge.
Figure 2:
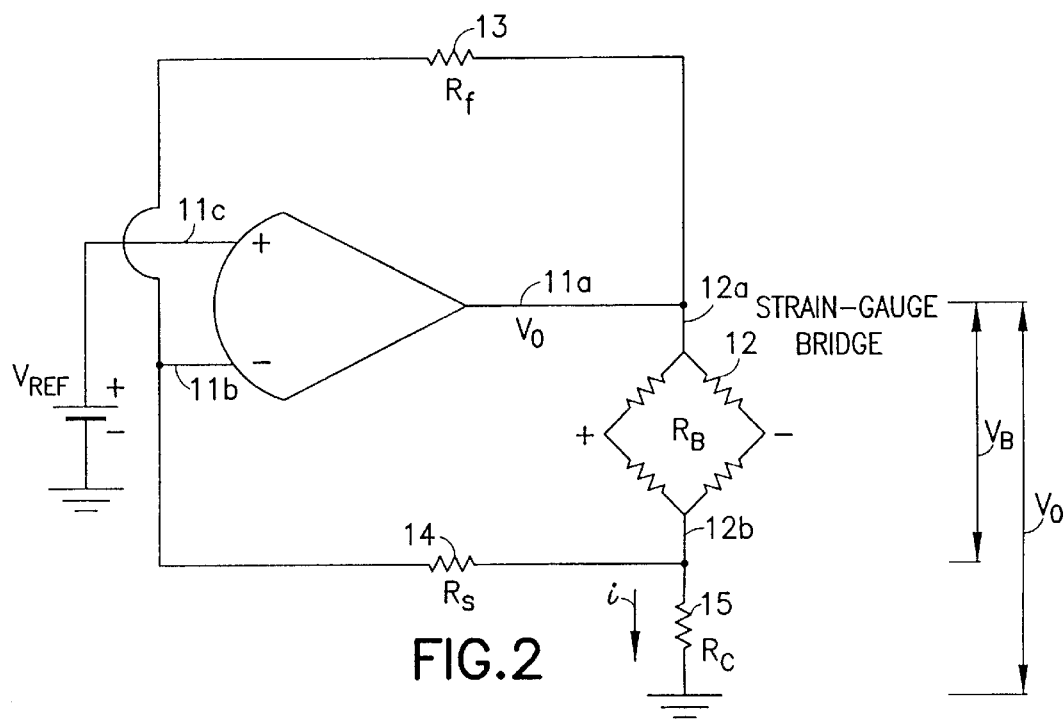
FIG. 2 is a schematic diagram of an improved silicon strain gauge bridge sensor circuit in accordance with the instant invention.

Reference is made to FIG. 2 for illustrating an electronic circuit for providing self compensation of a silicon strain gauge pressure transmitter in accordance with this invention. In FIG. 2 the output 11a of an operational amplifier 11 is connected to one node (input node) 12a of a strain gauge bridge 12 and an opposite node (output node) 12b of the strain gauge bridge 12 is connected to an inverting input 11b of the operational amplifier 11 through a series resistor $R_s$ 14. The output node 12b is additionally connected to one end of a current sampling resistance $R_c$ 15; where the other end of the current sample resistance $R_c$ 15 is connected to ground or some reference voltage point. A positive end of a reference voltage $V_{ref}$ 16 representing a voltage source such as a battery, is connected to the non-inverting input terminal 11c of the operational amplifier. A negative end of the battery is connected to ground or to the reference potential point. Additionally, a feedback resistance $R_f$ 13 is connected at one end to the inverting input 11b of the operational amplifier 11 and is connected at the other end to the output 11a of the operational amplifier 11. When constructed in this manner, the output voltage $V_o$ of the operational amplifier 11 is given by the expression:

$$v_o = \frac{R_f + R_s}{R_s + \frac{R_f R_c}{R_B + R_c}} \cdot V_{ref}$$

where $R_B$ is the equivalent resistance of the silicon strain gauge bridge 12. The equation shown above is for the output of the operational amplifier 11 applied on a power common.

Further mathematical analysis will show that the bridge voltage, which is the voltage drop across $R_B$, will follow the same curve shape as $R_B$ varies with temperature. The equation shows that the bridge excitation $V_o$ increases as the bridge resistance $R_B$ increases, thus compensating for the accompanying reduction in sensitivity inherent in silicon sensors. Additionally, the slope of the output voltage versus temperature can be changed by a selection process which chooses different values of $R_f$, $R_c$, and $R_s$ respectively. The result is that part of the output voltage $V_o$ across the strain gauge bridge resistance $R_B$, attains a maximum voltage value while using a reasonable amount of electrical current.

It is noted that in the instant invention only the non-linear resistance $R_B$ of the load or the silicon strain gauge bridge varies with the change in temperature. Additionally, further analysis will show that the voltage $V_B$, the voltage across the load or the silicon strain gauge bridge, follows the same curve shape as $R_B$ varies with temperature. Furthermore, the instant invention compensates the reduction in sensitivity inherent in silicon sensors by increasing the bridge excitation voltage as bridge resistance increases.

It is further noted that this invention teaches advantageously using commonly available and non-precision linear components to construct circuitry which achieves a suitable measurement accuracy for example, +/−0.3% within the temperature range of −40° C. to 85° C.

In general, this invention may be reduced to practice by a variety of means. In an embodiment of this invention, the following components may be used. The typical values of the components in an exemplary are listed below:

The bridge 12 is a light-implant 10 KΩ Si bridge. The feedback resistance $R_f$ 13 is 60 KΩ, the series resistance $R_s$ 14 is 5 KΩ, the current sample resistance $R_c$ is 1.3 KΩ, and the reference voltage $V_{ref}$ 16 is one Volt.

An example is now given to further illustrate the teachings of this invention. By example, one objective of the instant invention is to maintain a parameter, such as bridge sensitivity, as constant in value as possible. A further objective relates to span compensation, which is to provide the same amplified voltage span at wider temperature intervals. Similarly, room temperature could be used as a reference temperature for measuring the span. A span is defined as the output of the sensor (in mV) at full scale input, which is the pressure applied upon the sensor minus the output at zero input. As can be appreciated, the value of the span is relative. The output is measured between the positive and negative nodes of the Wheatstone bridge in FIG. 2. Furthermore, at any given temperature, the span is a function of the bridge excitation voltage, $V_B$, measured in volts. The span may be expressed in the follow equation:

$$\text{Span} = V_B \times S (\text{mV})$$

where S is the full scale sensitivity of the strain gauge bridge measured in mV/V.

The sensor is compensated as sensitivity drops over temperature by increasing the bridge voltage sufficiently to keep the equation balanced. The data listed below is for a nominal 10 KΩ bridge:

| Temperature | Bridge Resistance | Sensitivity |
|---|---|---|
| −28° C. | 8005Ω | 11.2 mV/V |
| +63° C. | 11904Ω | 9.204 mV/V | the functional relationship between bridge voltage and bridge resistance can be expressed in the following equation:

$$V_{ref} \cdot \frac{(R_s \cdot R_c + R_f R_{B1} + R_f \cdot R_c)}{(R_s \cdot R_{B1} + R_s \cdot R_c + R_f \cdot R_c)} \cdot S1 =$$

$$V_{ref} \cdot \frac{(R_s \cdot R_c + R_f R_{B2} + R_f \cdot R_c)}{(R_s \cdot R_{B2} + R_s \cdot R_c + R_f \cdot R_c)} \cdot S2$$

where $R_{B1}$=bridge resistance cold

S1=sensitivity cold $R_{B2}$=bridge resistance hot, and

S2=sensitivity at hot.

Exemplary values for $R_c$ and $R_s$ are as follows:

$R_c$=1300Ω

$R_s$=6000Ω

The values of $R_s$ and $R_c$ can be arbitrarily set to optimize the circuit in other areas, and $V_{ref}$ cancels out. The equation can then be solved for $R_f$. The value of $R_f$ in this example is 68.15 kΩ.

Regarding the above equation, it is noted that only the relative value of sensitivity is important, and not the actual or absolute value. It is further noted that the value of $V_{ref}$ can be used to scale the output since it too has no effect on the equation. Sensitivity of the sensor may vary by a factor of two to one in any given wafer lot, but the sensor's relative sensitivities, resistance values, and relative resistance values over temperature are tightly controlled by the production process. Therefore, span compensation can be achieved on a per lot basis over a wide temperature range, as shown above.

It is further noted that the instant invention enables the use of lot compensation data for the compensation of component values. Additionally, the instant invention also tends to compensate for the non-linear characteristics of resistance and sensitivity of the sensor by introducing an "overbow" multiplier to the "under-bow" characteristic of the sensor.

Figure 3:
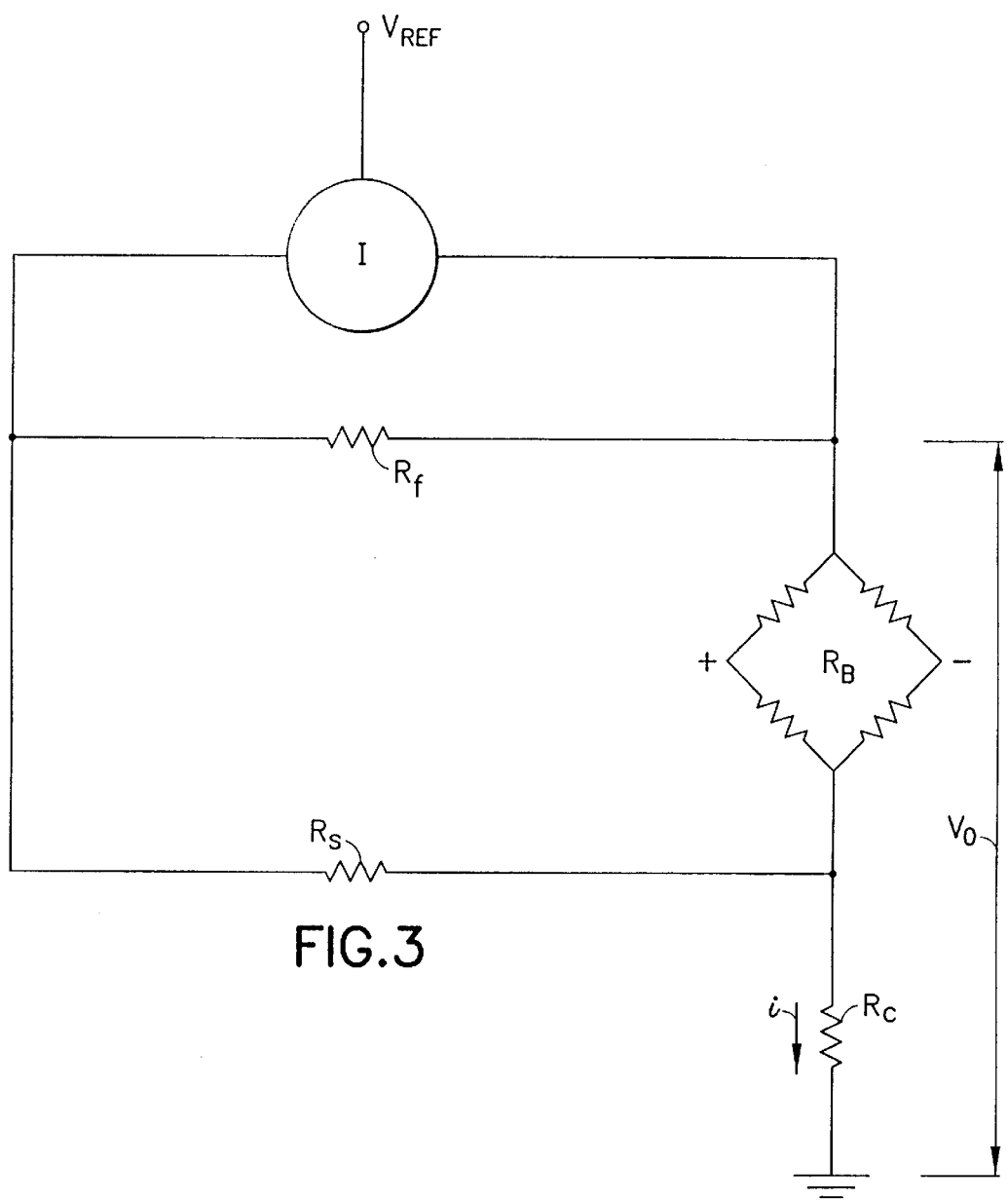
FIG. 3 is another schematic diagram of an improved silicon strain gauge bridge sensor circuit in accordance with the instant invention.

The instant invention teaches a circuitry comprising any current source that contribute to maintaining a constant current i through a load, such as the strain gauge bridge. The circuit includes a feedback resistance $R_f$, and a series resistance $R_s$ which contribute to maintaining the constant current over a wide temperature range, and eliminates the need for the current sampling resistance $R_c$ to be a non-linear thermistor resistance. The circuit further includes a reference voltage supplying power to the current source to maintain the constant current, as shown in FIG. 3.

Thus, while the invention has been particularly shown and described with respect to preferred embodiments thereof, it will be understood by those skilled in the art that changes in form and details may be made therein without departing from the scope and spirit of the invention.

What is claimed is:

1. A compensated sensor circuit, comprising:
    a bridge with temperature dependent resistance $R_B$;
    an excitation source comprising an amplifier, said amplifier having an output connected to an input node of said bridge, wherein said amplifier generates an output voltage proportional to bridge resistance;
    a resistance $R_c$ coupled between an output node of said bridge and a common potential;
    a first feedback resistance $R_f$ coupled between the input node of said bridge and an input of said excitation source; and
    a second feedback resistance $R_s$ coupled between said output node of said bridge and said input of said excitation source.

2. The compensated sensor circuit as recited in claim 1 further comprising:
    a reference voltage $V_{ref}$ coupled to a different input of said excitation source.

3. The compensated sensor circuit as recited in claim 1 wherein only resistance $R_B$ varies in value while temperature varies.

4. The compensated sensor circuit as recited in claim 1, wherein said circuit effectively compensates for the slight non-linearity with temperature of said bridge.

5. The compensated sensor circuit as recited in claim 1, wherein when resistance $R_B$ increases, the output voltage of the amplifier increases.

6. A circuit in combination with a strain gauge, said circuitry comprising:
    an amplifier coupled between a power source and a load including the strain gauge for maintaining a constant current through said load, the strain gauge having a bridge resistance $R_B$;
    a first feedback resistance $R_f$ coupled between an input node of the strain gauge and an input terminal of the amplifier;
    a second feedback resistance $R_s$ coupled between an output node of the strain gauge and said input terminal of the amplifier; and
    a load resistance $R_c$ coupled between said output node of the strain gauge transmitter and a common potential.

7. The circuit as recited in claim 6 further comprises:
    a reference voltage $V_{ref}$ coupled to a different input terminal of said amplifier.

8. The circuit as recited in claim 7, wherein:
    the reference voltage is coupled to a non-inverting input terminal of said amplifier;
    the first feedback resistance $R_f$ and the second feedback resistance $R_s$ are both coupled to an inverting input terminal of said amplifier; and
    an output voltage $V_o$ representing the voltage across said bridge resistance $R_s$ and current load resistance $R_c$ is shown by the expression of:

$$v_o = \frac{R_f + R_s}{R_s + \frac{R_f R_c}{R_B + R_c}} \cdot V_{ref}.$$

* * * * *